(12) United States Patent
Emma et al.

(10) Patent No.: US 8,521,999 B2
(45) Date of Patent: Aug. 27, 2013

(54) EXECUTING TOUCHBHT INSTRUCTION TO PRE-FETCH INFORMATION TO PREDICTION MECHANISM FOR BRANCH WITH TAKEN HISTORY

(75) Inventors: Philip G. Emma, Danbury, CT (US); Allan M. Hartstein, Yorktown Heights, NY (US); Brian R. Prasky, Poughkeepsie, NY (US); Thomas R. Puzak, Yorktown Heights, NY (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 12/721,933

(22) Filed: Mar. 11, 2010

(65) Prior Publication Data

US 2011/0225401 A1   Sep. 15, 2011

(51) Int. Cl.
G06F 9/38 (2006.01)
(52) U.S. Cl.
USPC ............... 712/240; 712/234; 712/E9.051
(58) Field of Classification Search
None
See application file for complete search history.

(56) References Cited

U.S. PATENT DOCUMENTS

| | | | |
|---|---|---|---|
| 4,370,711 A | 1/1983 | Smith | |
| 4,679,141 A | 7/1987 | Pomerene et al. | |
| 5,606,675 A | 2/1997 | Sakamura et al. | |
| 5,642,493 A | 6/1997 | Burgess | |
| 5,682,531 A | 10/1997 | Nakamura | |
| 5,742,804 A | 4/1998 | Yeh et al. | |
| 5,774,685 A | 6/1998 | Dubey | |
| 5,796,971 A | 8/1998 | Emberson | |
| 5,859,999 A | 1/1999 | Morris et al. | |
| 5,987,495 A | 11/1999 | Ault et al. | |
| 6,029,228 A | 2/2000 | Cai et al. | |
| 6,055,621 A | 4/2000 | Puzak | |
| 6,092,188 A | 7/2000 | Corwin et al. | |
| 6,108,775 A | 8/2000 | Shiell et al. | |
| 6,189,091 B1 | 2/2001 | Col et al. | |
| 6,272,623 B1 | 8/2001 | Talcott | |
| 6,308,322 B1 | 10/2001 | Serocki et al. | |
| 6,324,643 B1 | 11/2001 | Krishnan et al. | |
| 6,408,325 B1 | 6/2002 | Shaylor | |
| 6,427,192 B1 | 7/2002 | Roberts | |
| 6,560,693 B1 | 5/2003 | Puzak et al. | |
| 6,611,910 B2 | 8/2003 | Sharangpani et al. | |
| 6,671,762 B1 | 12/2003 | Soni et al. | |
| 6,725,365 B1 | 4/2004 | Cofler et al. | |
| 6,760,835 B1 | 7/2004 | Yu | |
| 6,877,089 B2 | 4/2005 | Sinharoy | |

(Continued)

OTHER PUBLICATIONS

Comp.arch (ARM V5: Preload with seperate I and D Cache); Newsgroup: conrip.arch; thread spanning Sep. 11, 2003 to Sep. 20, 2003; 29 pages.

(Continued)

Primary Examiner — Kenneth Kim
(74) Attorney, Agent, or Firm — Cantor Colburn LLP; William Stock

(57) ABSTRACT

A method comprising receiving a branch instruction, decoding a branch address and the branch instruction, executing a branch action associated with the branch address, determining whether a branch associated with the branch action was taken, and saving an identifier of the branch instruction and in indicator that the branch action was taken in a prefetch history table responsive to determining that the branch associated with the branch action was taken.

24 Claims, 9 Drawing Sheets

(56) References Cited

U.S. PATENT DOCUMENTS

| | | |
|---|---|---|
| 6,957,327 B1 | 10/2005 | Gelman et al. |
| 7,197,630 B1 | 3/2007 | Alsup et al. |
| 7,272,664 B2 | 9/2007 | Arimilli et al. |
| 7,441,110 B1 * | 10/2008 | Puzak et al. ............ 712/237 |
| 7,870,371 B2 | 1/2011 | Mutlu et al. |
| 2002/0194462 A1 | 12/2002 | Henry et al. |
| 2005/0278513 A1 | 12/2005 | Aristodemou et al. |
| 2006/0218385 A1 | 9/2006 | Smith et al. |
| 2007/0083739 A1 | 4/2007 | Glew |
| 2007/0088915 A1 | 4/2007 | Archambault et al. |
| 2007/0250666 A1 | 10/2007 | Sartorius et al. |
| 2008/0052499 A1 | 2/2008 | Koc |
| 2009/0089564 A1 | 4/2009 | Brickell et al. |
| 2009/0313462 A1 | 12/2009 | Emma et al. |
| 2010/0287358 A1 | 11/2010 | Emma et al. |

OTHER PUBLICATIONS

IBM TDB (Typing Data Prefetching to Branch Prediction); TBD-ACC-No. NN931069; IBM Technical Disclosure Bulletin, Oct. 1993, US; vol. 36, Issue 10, pp. 69-70, Oct. 1, 1993; 2 pp.

Philip G. Emma et al., pending U.S. Appl. No. 12/138,789 entitled "Branch Prediction Path Instruction," filed with the U.S. Patent and Trademark Office on Jun. 13, 2008.

Philip G. Emma et al., pending U.S. Appl. No. 12/435,631 entitled "Branch Prediction Path Instruction," filed with the U.S. Patent and Trademark Office on May 5, 2009.

* cited by examiner

| 502 | 504 | 506 | 508 | 510 |
|---|---|---|---|---|
| Opcode | Branch Mask | Branch Address | Target Address | Tag Info |

EXECUTING TOUCHBHT INSTRUCTION TO PRE-FETCH INFORMATION TO PREDICTION MECHANISM FOR BRANCH WITH TAKEN HISTORY

BACKGROUND

The present invention relates to computer processing, and more specifically, to branch prediction methods in computer processing.

Branch prediction is used to enhance the performance of modern processors. When a processor detects a conditional branch, an uncertainty is temporarily introduced into the pipeline of the processor. If the branch is taken, the next instruction is fetched from an address usually specified in the branch instruction. If the branch is not taken, execution proceeds to the instruction following the branch.

Large amounts of chip area are usually dedicated to the branch prediction mechanism in a processor. In practice, the branch address and target address of each branch encountered by the processor are saved in a table, typically called a Branch History Table (BHT). During the instruction fetch phase of a processing pipeline, the BHT is searched for a matching branch address, and if found, its target is fetched and the instruction located at this address becomes the next instruction decoded. If no matching branch address is found in the instruction fetch segment, instruction fetching and decoding continue down the sequential path. Branch prediction errors occur when the table is incorrect and corrections to the table are implemented.

Prefetching is a commonly used tool to reduce cache miss delays and improve cache hit ratios. Prefetching is also used as a technique to reduce the delays caused by branch prediction errors. Branch-prediction prefetching attempts to anticipate which parts of a program will be used in the near future and prefetches information that describes the upcoming branch into the branch predictor.

BRIEF SUMMARY

According to one embodiment of the present invention, a method includes receiving a branch instruction, decoding a branch address and the branch instruction, executing a branch action associated with the branch address, determining whether a branch associated with the executed branch action was taken, saving an identifier of the branch instruction and an indicator that the branch action was taken in a prefetch history table responsive to determining that the branch associated with the branch action was taken, receiving a second branch instruction and an associated prefetch branch history table (TouchBHT) instruction, retrieving an entry in the prefetch history table having an identifier associated with the second branch instruction responsive to receiving the Touch-BHT instruction, determining whether the entry indicates that a branch action associated with the second branch instruction was taken, and executing the branch instruction.

According to another embodiment of the present invention, a system includes a processor operative to receive a branch instruction, decode a branch address and the branch instruction, execute a branch action associated with the branch address, determine whether a branch associated with the executed branch action was taken, save an identifier of the branch instruction and an indicator that the branch action was taken in a prefetch history table responsive to determining that the branch associated with the branch action was taken, receive a second branch instruction and an associated prefetch branch history table (TouchBHT) instruction, retrieve an entry in the prefetch history table having an identifier associated with the second branch instruction responsive to receiving the TouchBHT instruction, determine whether the entry indicates that a branch action associated with the second branch instruction was taken, and execute the branch instruction.

According to yet another embodiment of the present invention, a branch prediction system includes a means for receiving a branch instruction, a means for decoding a branch address and the branch instruction, a means for executing a branch action associated with the branch address, a means for determining whether a branch associated with the executed branch action was taken, a means for saving an identifier of the branch instruction and an indicator that the branch action was taken in a prefetch history table responsive to determining that the branch associated with the branch action was taken, a means for receiving a second branch instruction and an associated prefetch branch history table (TouchBHT) instruction, a means for retrieving an entry in the prefetch history table having an identifier associated with the second branch instruction responsive to receiving the TouchBHT instruction, a means for determining whether the entry indicates that a branch action associated with the second branch instruction was taken, and a means for executing the branch instruction.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

A prefetching technique involves inserting prefetching instructions into a program. Some processors may include an instruction, the Data-Cache-Block-Touch (DCBT) instruction that prefetches a line of memory into the cache. A compiler (that may use static and/or dynamic complication techniques), or a programmer can insert these prefetching instructions (a Touch instruction), in the program ahead of the actual use of the data in an attempt to assure that the data will be in the cache.

Similarly prefetching touch branch history table (TouchBHT) instructions can be used to prefetch information into the branch prediction mechanism. A TouchBHT instruction consists of an opcode, and identifies the branch and target address, and taken/not-taken information for an upcoming branch. The compiler or programmer inserts the TouchBHT instructions into a program to prefetch future branch information (branch address, target address, and taken/not-taken information) into the branch prediction mechanism ahead of its normal use by the processor.

It is desirable to conditionally determine the usefulness of each TouchBHT instruction inserted into a program, execute the useful instructions, and discard the useless instructions.

Figure 1:
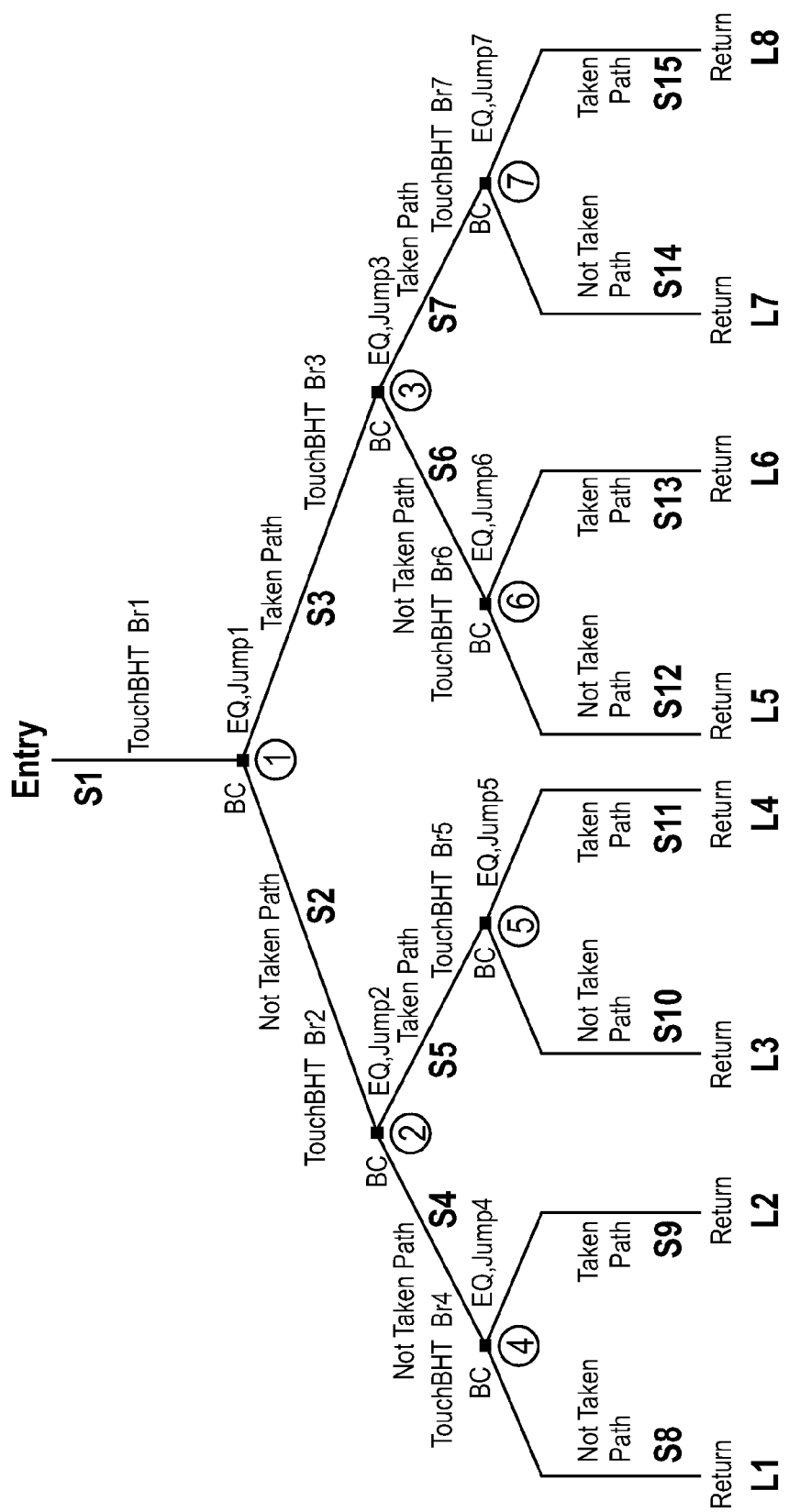
FIG. 1 illustrates a tree graph of an example program.

FIG. 1 illustrates a tree graph of an example program containing seven branches. The seven branches are numbered Br1, Br2, . . . , and Br7 and identify branches BC EQ,Jump1, BC EQ,Jump2, through BC EQ,Jump7, respectively. There are seven TouchBHT instructions that prefetch branch information for the seven branches into the branch prediction mechanism. Following each touch instruction is a corresponding branch instruction that conditionally branches based on an equal/not equal condition.

The seven branches divide the program into fifteen program segments (S1, S2, . . . , S15) and eight leaf nodes (L1, L2, . . . , L8). Each branch is numbered with its number circled. The not-taken path for each branch is shown as the left edge of a tree fork and the taken path is the right edge. The seven TouchBHT instructions occur ahead of their branch instruction counterparts. Each TouchBHT instruction identifies the upcoming branch and loads the BHT with information (prefetches) that will be used to predict the upcoming branch.

In order to increase the amount of time between the TouchBHT instructions and the subsequent branch they identify (to increase timeliness), the compiler moves or 'percolate up' the TouchBHT instructions in the program. This technique is known as code migration. However, increasing prefetch timeliness through code migration, also has certain risks, and these risks may degrade performance. One common risk is BHT contamination where unused information is inserted into the branch prediction mechanism.

To illustrate this risk, consider the program control flow graph shown in FIG. 1. If the compiler moves the TouchBHT instruction for branch B4 in segment 4 (BC EQ, Jump4), into segment 2, to increase the amount of time between prefetching the information and its subsequent use, then the compiler is attempting to predict the outcome of the branch B2 (BC EQ, Jump2), either taken or not-taken. In this example, the compiler assumes that branch B2 is not-taken. If the actual execution flow of the program is from branch B2 to branch B5, because branch B2 is taken, then the BHT is loaded with information that will not be used.

Similarly, the compiler may move both TouchBHT instructions, for branches B4 and B5, into segment 2. Now, segment 2 will load the BHT with information for branches B2, B4, and B5. However, depending on the outcome of branch B2, only two of the prefetches will be used. If branch B2 is not-taken, then the TouchBHT for branch B5 is not used. If the branch is taken, then the TouchBHT for branch B4 is not used.

Figure 2:
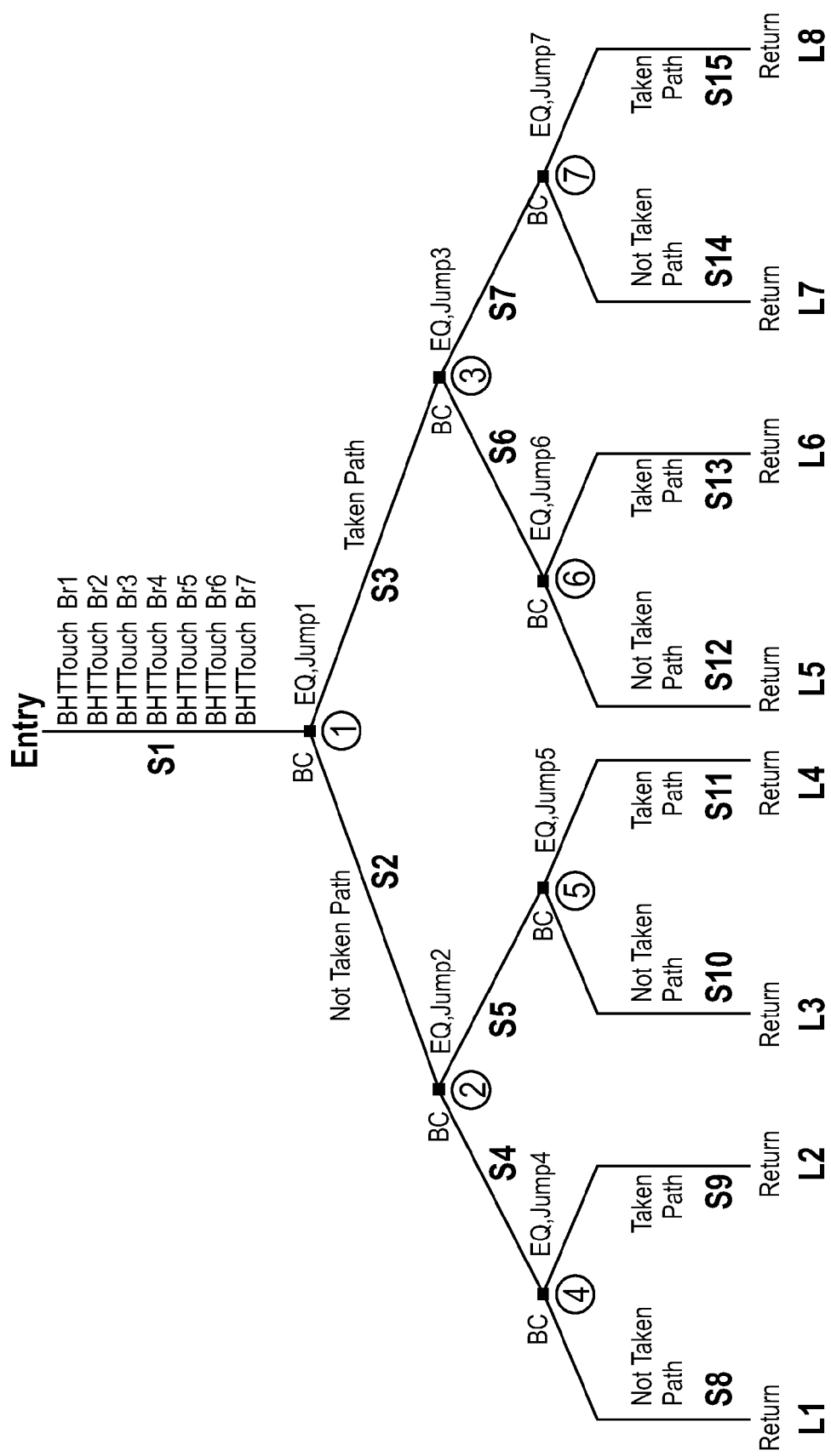
FIG. 2 illustrates a tree graph of another example program.

FIG. 2 illustrates an example where all seven TouchBHT instructions are moved into program segment 1. It is desirable to only execute the TouchBHT instructions that contain information that will be used by the branch predictor. For example, if the program flow is from segment 1 to leaf node L5, then only TouchBHT instructions for branches B1, B3, and B6 are used. The other prefetches (4 out of 7) contaminate the BHT with information that is not used.

There are several reasons why unused prefetches should be avoided. First, each prefetch that is not used contaminates the BHT with useless information and wastes valuable space in the BHT. Second, when a prefetch is made, the replacement algorithm chooses BHT information to discard. If the branch corresponding to the discarded BHT information is re-encountered an additional branch prediction error will occur. Third, when an unused TouchBHT is executed, the BHT is still updated. During this time the branch predictor may be blocked from referencing the BHT and an additional branch prediction error may occur.

It is desirable for the compiler or programmer to move all seven TouchBHT instructions into program segment 1 (as shown in FIG. 2) and to execute those TouchBHT instructions that produce useful results. The embodiments of the described prediction mechanism use the repeatability and predictability of a program execution flow to capture the repetitive flow of a program. By selectively executing the prefetching instructions, the compiler may 'move up' the TouchBHT instructions in a program, to increase the distance between the TouchBHT instruction and its use by the branch predictor, thus increasing the potential performance gained by the prefetch.

An exemplary embodiment of a prefetch mechanism uses a Prefetch-History-Table (PHT) to predict the usefulness of each prefetch instruction encountered by the processor. The PHT records the actions (taken/not taken) of the previously executed branch instructions. TouchBHT instructions that identify branches that were previously taken are executed, whereas TouchBHT instructions that identify branches that were not taken are discarded. By this process the PHT determines whether a TouchBHT instruction will prefetch information that is useful to the branch predictor. TouchBHT instructions that previously prefetched unused information are not executed—avoiding contamination of the BHT with unused information.

An exemplary embodiment of a PHT is arranged as an array of entries where each entry contains taken/not-taken information on the most recently executed branches. An entry in the PHT is selected by using a subset of bits from the branch address. For example, 14 bits from the branch address are used to address a PHT with 16K entries. An entry in the PHT may contain a single bit of history information, where a one '1' indicates that the branch corresponding to the address was taken the last time it was encountered and a value of zero '0' indicates that the branch was not taken. Alternate embodiments of the PHT may contain the actual address of the branch (or subset of the address bits), and additionally use a plurality of bits to record a history of branch actions for each entry.

Figure 3:
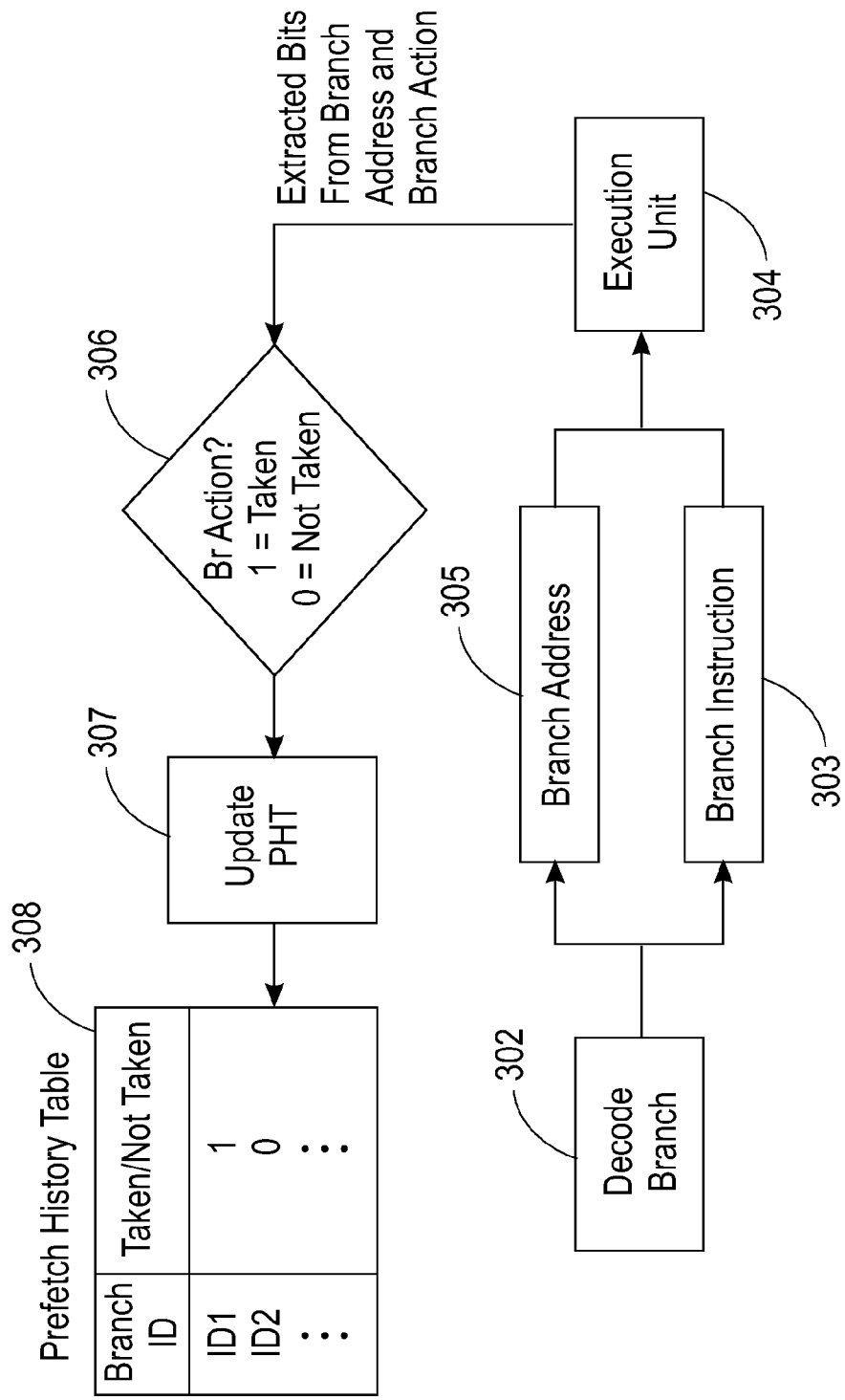
FIG. 3 illustrates an exemplary embodiment of structure and logic used to update a Prefetch History Table (PHT).

FIG. 3 illustrates an exemplary embodiment of structure and logic used to update the PHT. It is assumed that all instructions are executed in-order, and one-at-a-time, however out of order, superscalar, multithreaded, and multiprocessor designs are not precluded from the description presented.

A branch is decoded in block 302. The branch instruction 303 and the branch address 305 are sent to the execution unit 304. After execution, the branch action (taken or not-taken) status of the branch is determined in block 306. In block 307, an identifier of the branch, and the branch action status is updated or saved in the PHT 308. If the branch was taken, the entry corresponding to the selected branch address is set to 1.

If the branch was not taken, its entry is set to 0. When a TouchBHT instruction is encountered, the history information contained in the PHT 308 is used to determine if the instruction is executed and if the branch prediction mechanism is updated.

Figure 4:
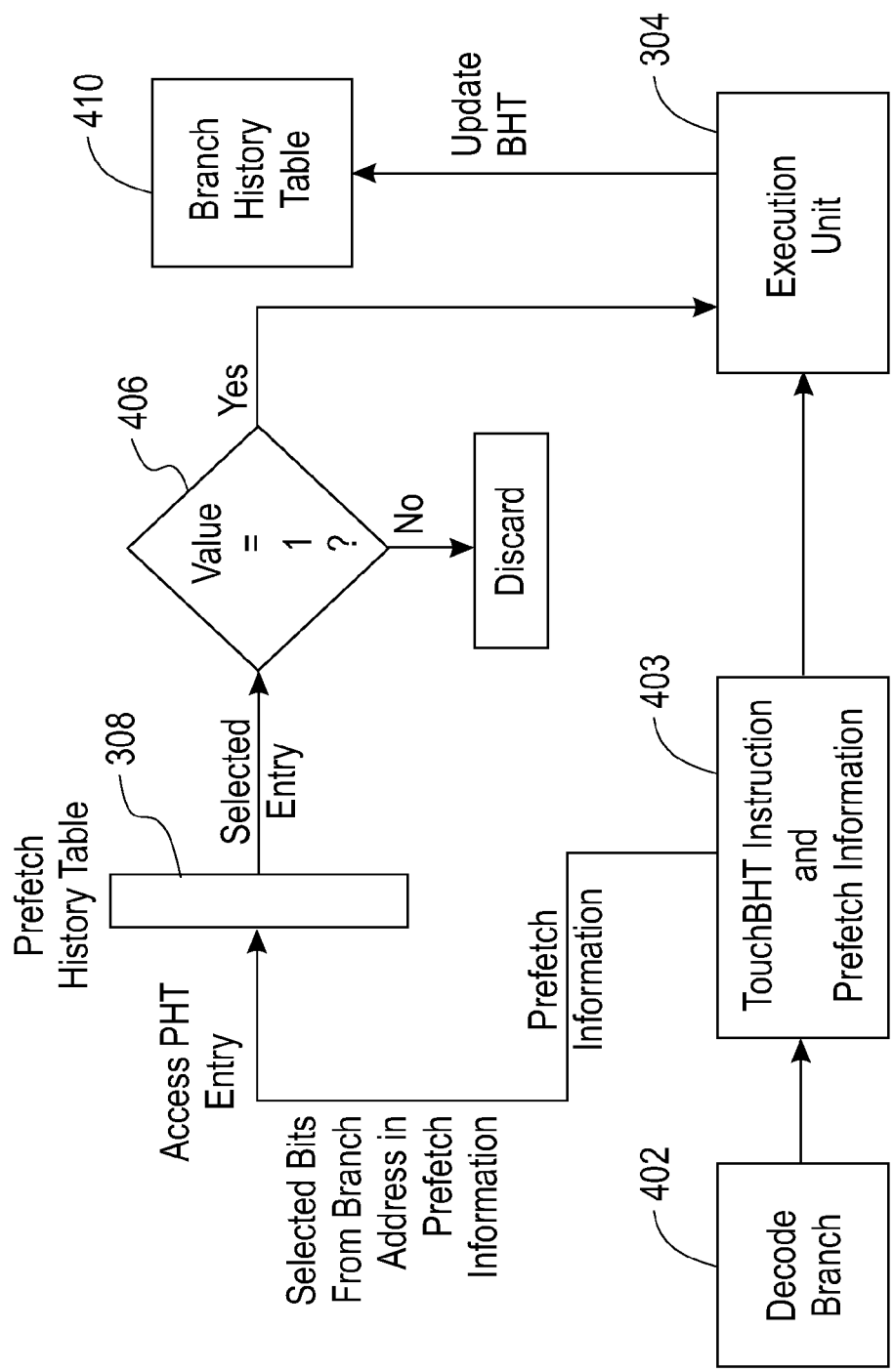
FIG. 4 illustrates the logic used to access the PHT of FIG. 3.

FIG. 4 illustrates the logic used to access the PHT 308 when a TouchBHT instruction is encountered. The Touch-BHT instruction and the information for the branch it describes (branch address, target address, and branch information) 403 are sent to the execution unit 304. Simultaneously the address of the upcoming branch (contained in the prefetch information) is sent to the PHT 308 where an entry is selected and its taken/not taken branch pattern is examined. Each PHT entries identifies a previously executed branch. Block 406 determines the value of the selected entry. If the selected bit is a 0, the TouchBHT instruction is not executed and no update occurs. If the selected entry bit is a 1 (indicating a branch at this address was recently taken), the TouchBHT instruction is executed by the execution unit 304, and the Branch History Table (BHT) 410 is updated.

In an alternate embodiment the PHT 308 is accessed by forming a hybrid address using the branch address and a Global History Vector (GHV) describing the taken/not-taken pattern of the most recently executed branches. For example, consider a 3 bit GHV. The vector indicates the taken/not-taken pattern of the last 3 branches encountered by the processor, where the bit position indicates the recency of the branch. That is, the first bit in the vector corresponds to the first most recently executed branch, the 2nd bit in the vector corresponds to the second most recently executed branch and the 3rd bit corresponds to the third most recently executed branch. The value of each bit is a 0 or 1, where a 0 indicates that the branch corresponding to that position was not taken, and a 1 indicates that the branch was taken. Whenever a TouchBHT instruction is encountered, the branch address (contained in the prefetched information) and contents of the global history vector are merged to form a hybrid identifier using an Exclusive-Or function. The hybrid address is used to access the PHT 308. The hybrid address incorporates the most recent branch path and the actual branch address to identify a PHT entry.

Figure 5:
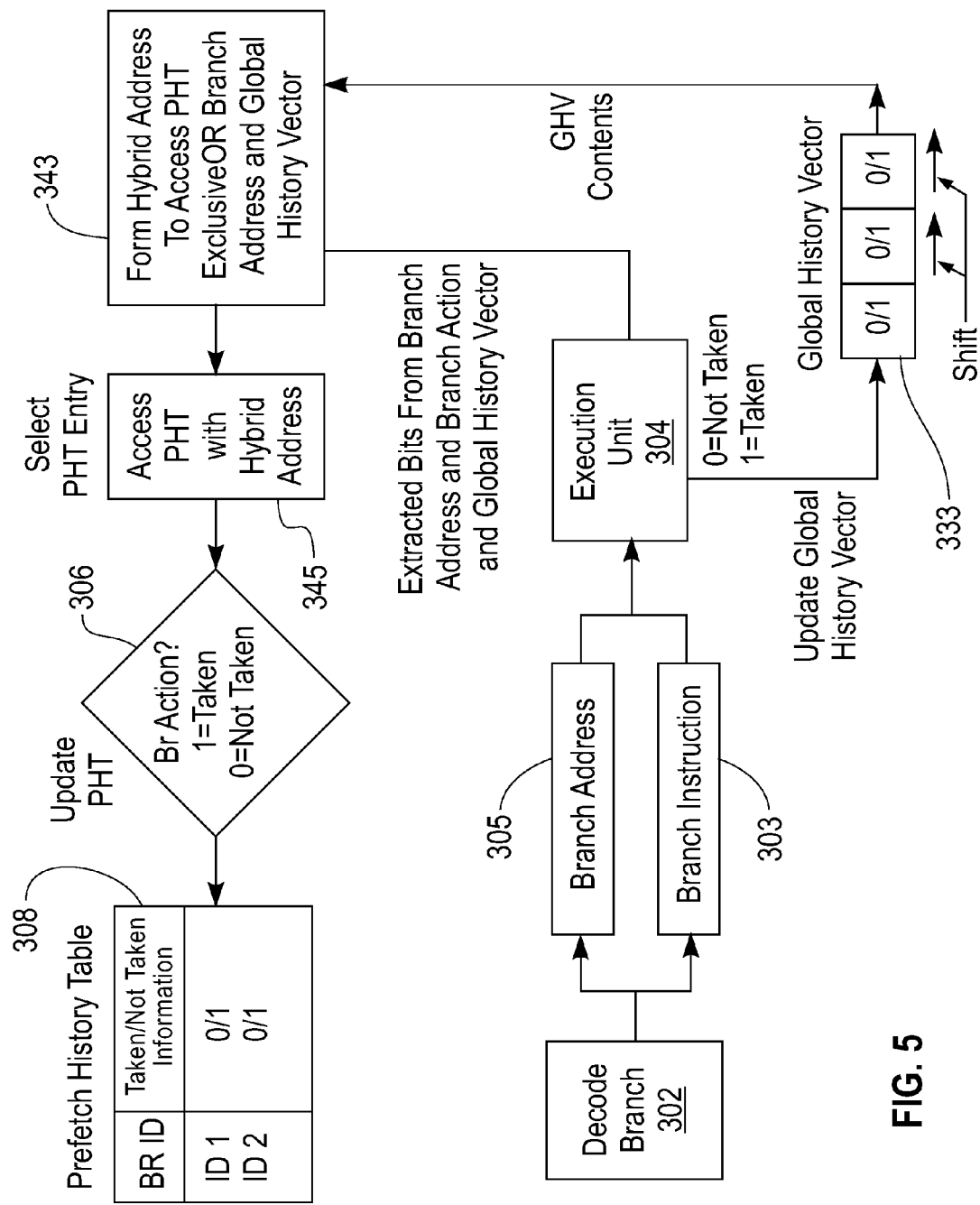
FIG. 5 illustrates an exemplary embodiment of structure and logic used to update a PHT with a Global History Vector.

FIG. 5 illustrates an exemplary embodiment of structure and logic used to update the PHT with a GHV. The logic is similar to the logic described in FIG. 3. A branch is decoded in block 302. The branch instruction 303 and the branch address 305 are sent to the execution unit 304. After execution, the branch action (taken or not-taken) is determined and sent to the GHV 333 for update. The taken/not-taken action is saved in the first position of the GHV. Simultaneously, the old values of bit position one and two are shifted right one position to form a three bit history of the most recently executed branches. The hybrid address used to access the PHT is calculated in block 343. Here the address of the branch and the contents of the GHV are combined using an Exclusive-Or function. In block 345, the PHT is accessed with the hybrid address. In block 308 a PHT entry is identified (using the hybrid address) and the branch address and the most recent taken/not-taken branch action are saved.

Figure 6:
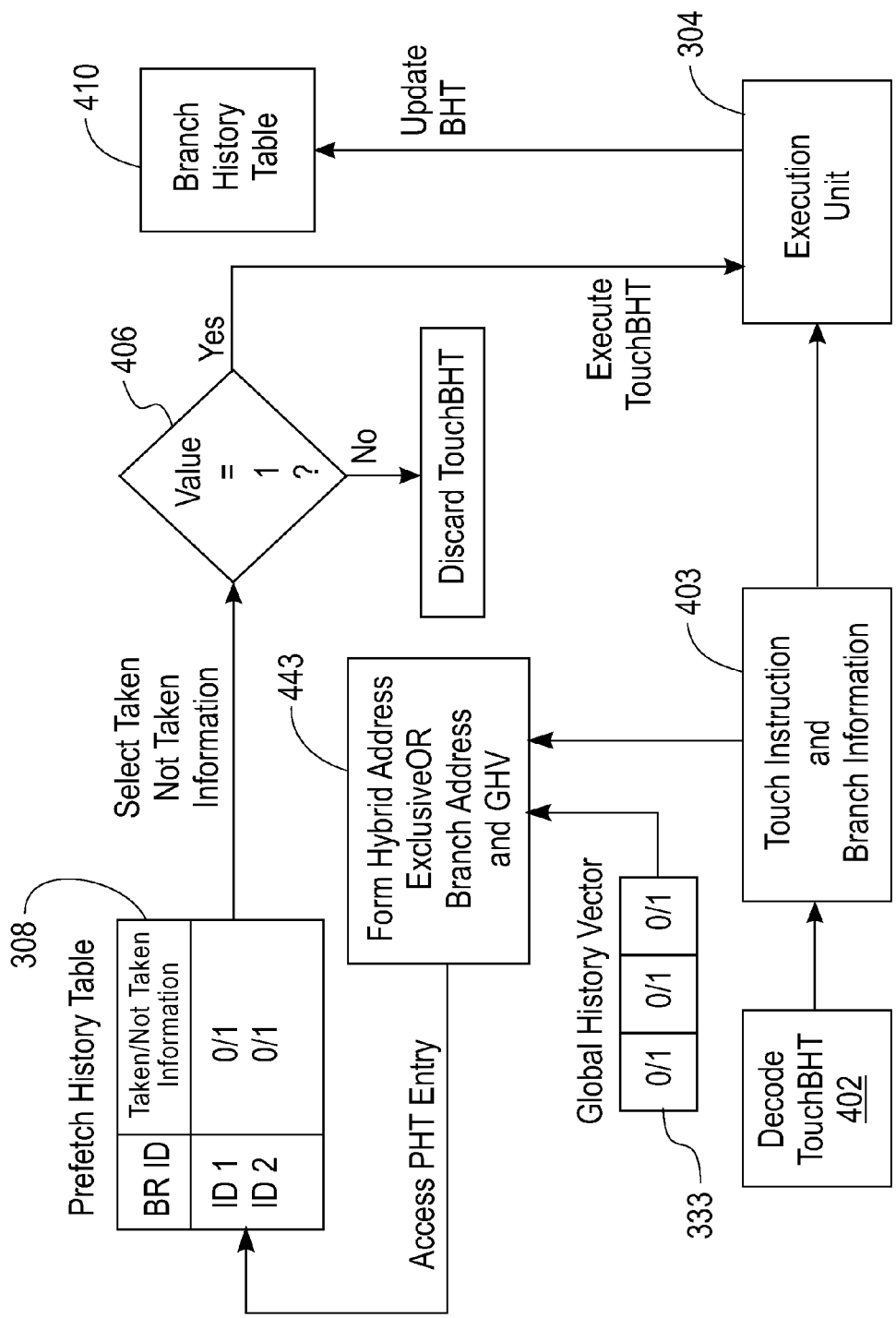
FIG. 6 illustrates the logic used to access the PHT of FIG. 5.

FIG. 6 illustrates the logic used to access the PHT 308 when a TouchBHT instruction is encountered. The Touch-BHT instruction and the information for the branch it describes (branch address, target address, and branch information) 403 are sent to the execution unit 304. Simultaneously the address of the upcoming branch (contained in the prefetch information) and the contents of the Global History Vector 333 are sent to block 443 to form a hybrid address to access the PHT 308. The hybrid address is formed using the same method the PHT 308 was accessed when a branch instruction was encountered. The branch address and GHV are combined using an Exclusive-Or function. The PHT 308 is then accessed using this value. If the branch address value saved in the PHT 308 matches the branch address from the TouchBHT instruction, the branch taken/not taken bit associated with the identified entry is examined. Block 406 determines the value of the selected entry. If the selected bit is a 0, the TouchBHT instruction is not executed and no update occurs. If the selected entry bit is a 1 (indicating a branch at this address was recently taken), the TouchBHT instruction is executed by the execution unit 304, and the Branch History Table (BHT) 410 is updated. If the branch address value saved in the PHT 308 does not match the branch address from the TouchBHT no information regarding the usefulness of the TouchBHT is available. In a preferred embodiment the TouchBHT is executed. However, an alternative embodiment may choose to not execute the TouchBHT instruction.

Figures 7, 8:
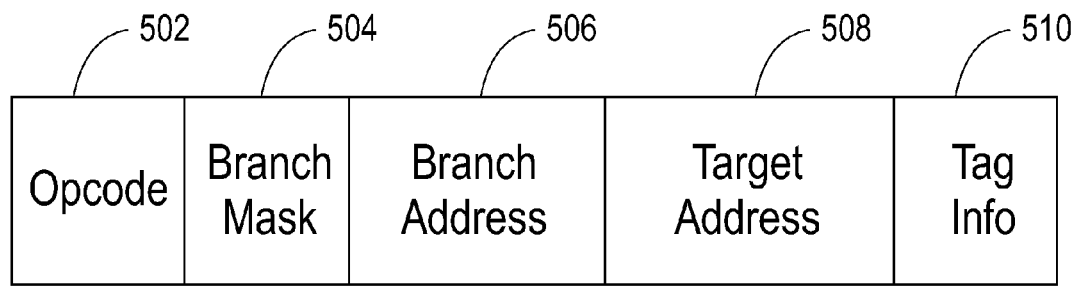
FIG. 7 illustrates an exemplary embodiment of TouchBHT instruction fields.
FIG. 8 illustrates an exemplary embodiment of PHT with Branch Action Vector.

FIG. 7 illustrates an exemplary embodiment of a Touch-BHT instruction format. The TouchBHT instruction has an Opcode field 502 that presents the opcode used by the instruction. A Branch Mask field 504 indicates the branch action or direction of the next N unique (loop free) branches encountered between the TouchBHT instruction and the branch instruction identified by the instruction. This field represents the predicted path of the intervening branches between the TouchBHT instruction and the branch it identifies. This field may be computed by the compiler after the program is defined. For example, referring to FIG. 1, if the compiler moves the TouchBHT instruction for branch B6 in segment 6 into segment 1, the TouchBHT instruction is moved across two branches in the execution path of the program. The outcome for each intervening branch, used to reach branch B6, is represented by an individual sub-field where each sub-field may have one of three values, T, the branch is taken; N, the branch is not-taken; D, the branch can either be taken or not-taken. In this case the branch direction is 'don't care'. Thus, a 3 bit branch mask for TouchBHT B6 (moved from segment 6 to segment 1) would be TND. Referring again to FIG. 7, the TouchBHT instruction includes a Branch Address field 506 that specifies the address of the upcoming branch that the TouchBHT instruction identifies. A Target Address field 508 specifies the target address of the upcoming branch that the TouchBHT instruction identifies. A Tag Information field 510 identifies, for example, the upcoming branch as conditional or unconditional, guessed taken/not-taken, branch history patterns, thread of process identifiers, and other prediction hints or instruction prefetch and execution information.

Each entry in the PHT 308 is modified to record the branch action (taken/not taken) of the previous N unique branches that preceded the branch identified by the PHT 308 entry. FIG. 8 illustrates an exemplary embodiment of structure of the PHT 308. Each entry in the PHT 308 has a branch identifier field, and branch taken/not taken history field as before. Additionally, each entry in the PHT 308 has a Branch Action Vector (BAV) field 317 that records the action of the previous N branches that preceded the branch identified by this entry. For example, referring to FIG. 1, let each entry in the PHT 308 record the branch action of the last three branches executed for that entry, where taken=1 and not-taken=0. If a compiler moves the TouchBHT instruction for B6 into segment 1, let B0 denote the branch executed just prior to branch B1. If the first two bits of the PHT 308 entry for branch B0 are 10 (the first branch is taken followed by a not-taken branch) and the branch mask field for the TouchBHT instruction B6 is TND; the TouchBHT instruction is executed and the information is sent to the BHT. TouchBHT instructions with different branch masks fields, indicating that the predicted path (computed by a compiler) does not match the actual branch action path (saved at run time) are discarded. In the embodiment above the third bit in the PHT 308 entry can either be a 1 or 0 and the TouchBHT instruction would still be executed.

Figure 9:
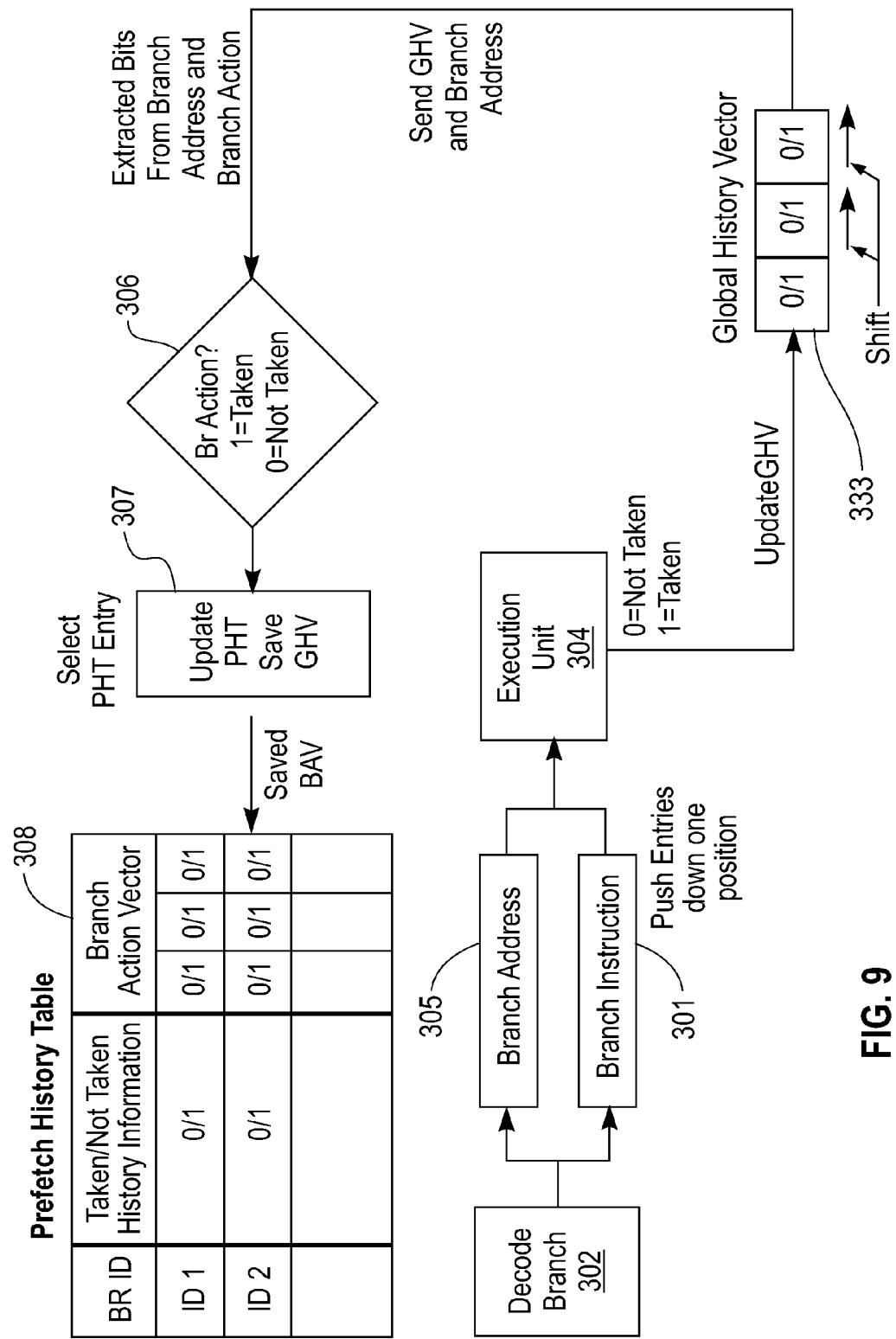
FIG. 9 illustrates an exemplary embodiment of structure and logic used to update a PHT with a Branch Action Vector

FIG. 9 illustrates an exemplary embodiment of the structure and logic used to update the PHT 308 in this embodiment. Each entry of the PHT 308 contains the actions (taken/not taken) of the previous three branches encountered by the processor for that entry. The logic presented is similar to the logic described in FIG. 5 and uses a Global History Vector (GHV) to record the taken/not-taken history of the previously executed branches As before, a branch is decoded in block 302. The branch instruction 303 and the branch address 305 are sent to the execution unit 304. After execution, the branch action (taken or not-taken) status is known and the contents of the Global History Vector 333 and branch address are sent to the PHT 308 where they are saved.

Figure 10:
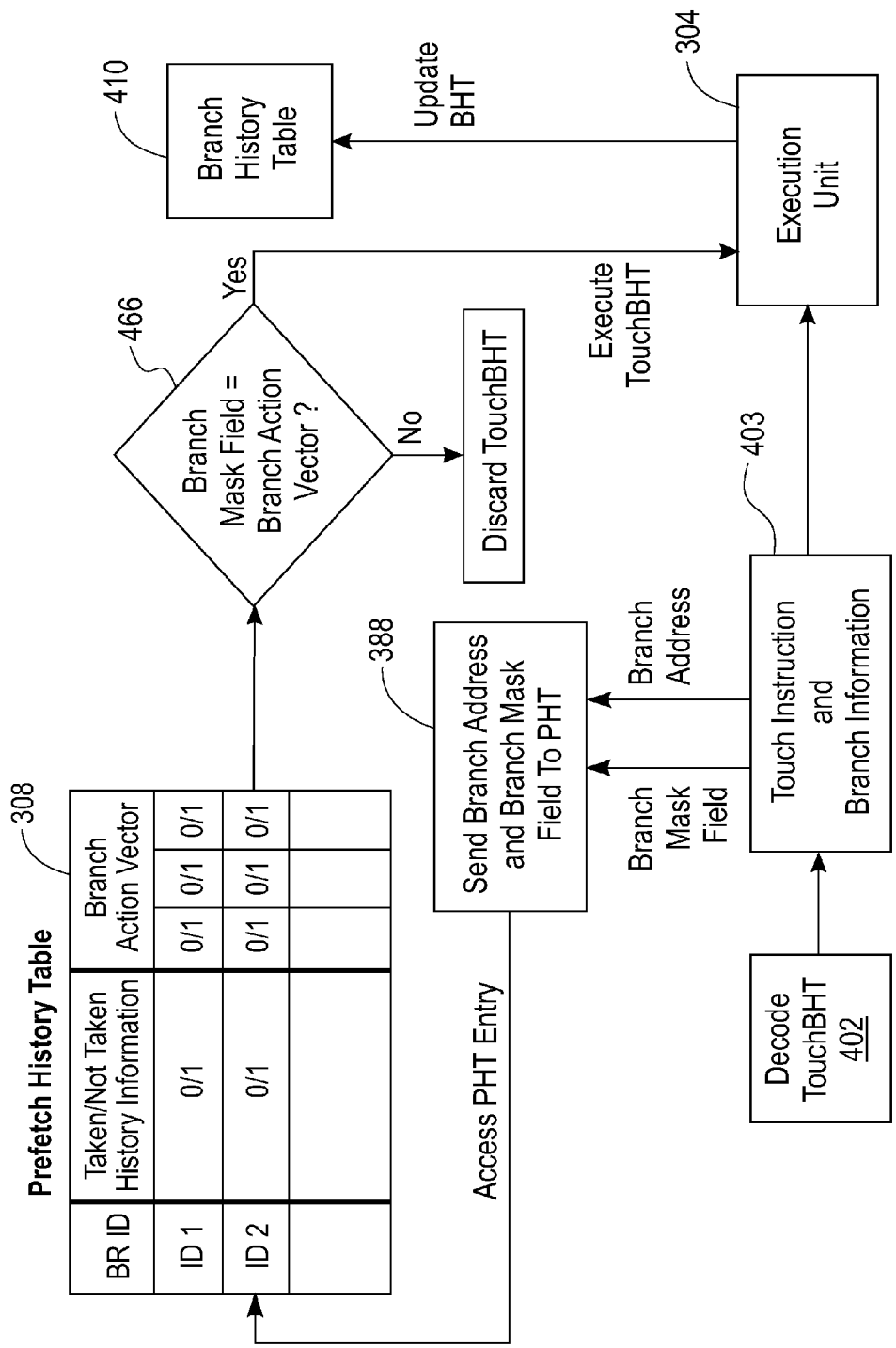
FIG. 10 illustrates an exemplary embodiment of structure and logic used to access a PHT with a Branch Action Vector

FIG. 10 illustrates the logic used to access the PHT 308 containing a Branch Action Vector when a TouchBHT instruction is encountered. The TouchBHT is decoded in block 402 then the branch address 506 and branch mask field 504 are extracted in block 403 and sent to PHT access logic 388. Simultaneously, the decoded information is sent to the execution unit 304. The PHT 308 is accessed using the branch address and the information contained in the matching Branch Action Vector is extracted. In Block 466 the Branch Mask Field 504 (from the TouchBHT instruction) is compared with the information contained in the matching Branch Action Vector. If a match occurs the TouchBHT instructions is executed and the branch prediction mechanism is updated. If the fields do not match the touchBHT instruction is discarded (not executed).

The technical effects and benefits of the embodiments described above include determining the usefulness of TouchBHT instructions inserted into a program, executing the useful instructions, and discarding the useless instructions to increase the processing efficiency of a processor pipeline.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
   receiving a branch instruction;
   decoding a branch address and the branch instruction;
   executing a branch action associated with the branch address and the branch instruction;
   determining whether a branch associated with the executed branch action was taken;
   saving an identifier of the branch instruction and an indicator that the branch action was taken in a prefetch history table responsive to determining that the branch associated with the branch action was taken;
   receiving a prefetch branch history table (TouchBHT) instruction, wherein the TouchBHT instruction is associated with a second branch instruction;
   retrieving an entry in the prefetch history table having an identifier associated with the second branch instruction responsive to receiving the TouchBHT instruction;
   determining whether the entry indicates that a branch action associated with the second branch instruction was taken; and
   executing the TouchBHT instruction responsive to determining that the entry indicates that the branch action associated with the second branch instruction was taken.

2. The method of claim 1, wherein the method further comprises updating a branch history table responsive to executing the branch instruction.

3. The method of claim 1, wherein the TouchBHT instruction includes:
   an opcode field including an opcode used by the TouchBHT instruction;
   a branch mask field including a branch action of the TouchBHT instruction;
   a branch address field including an address of an upcoming branch associated with the TouchBHT instruction; and
   a target address field including a target address of the upcoming branch.

4. The method of claim 3, wherein the TouchBHT instruction further includes a tag information field including an indicator of whether the upcoming branch is a conditional branch.

5. The method of claim 3, wherein the TouchBHT instruction further includes a tag information field including an indicator of whether the upcoming branch is a taken branch.

6. The method of claim 1, wherein the identifier of the branch instruction is a function of the branch address.

7. The method of claim 1, wherein the identifier of the branch instruction is a function of the branch address and a global history vector.

8. The method of claim 7, wherein the function of the branch address and the global history vector is an XOR logic function of a portion of the branch address and the global history vector.

9. The method of claim 1, wherein the method further comprises:
  determining whether a branch mask field matches a global history vector, wherein the TouchBHT instruction includes the branch mask field having a branch action of the TouchBHT instruction and the prefetch history table includes a global history vector; and
  executing the TouchBHT instruction responsive to determining that the branch mask field matches the global history vector.

10. The method of claim 9, wherein the identifier of the branch instruction is a function of the branch address.

11. The method of claim 9, wherein the identifier of the branch instruction is a function of the branch address and a global history vector.

12. The method of claim 11, wherein the function of the branch address and the global history vector is an XOR logic function of a portion of the branch address and the global history vector.

13. A system comprising a processor operative to receive a branch instruction, decode a branch address and the branch instruction, execute a branch action associated with the branch address and the branch instruction, determine whether a branch associated with the executed branch action was taken, save an identifier of the branch instruction and an indicator that the branch action was taken in a prefetch history table responsive to determining that the branch associated with the branch action was taken, receive a prefetch branch history table (TouchBHT) instruction, wherein the TouchBHT instruction is associated with a second branch instruction, retrieve an entry in the prefetch history table having an identifier associated with the second branch instruction responsive to receiving the TouchBHT instruction, determine whether the entry indicates that a branch action associated with the second branch instruction was taken, and execute the TouchBHT instruction responsive to determining that the entry indicates that the branch action associated with the second branch instruction was taken.

14. The system of claim 13, wherein the processor is further operative to update a branch history table responsive to executing the branch instruction.

15. The system of claim 13, wherein the TouchBHT instruction includes:
  an opcode field including an opcode used by the TouchBHT instruction;
  a branch mask field including a branch action of the TouchBHT instruction;
  a branch address field including an address of an upcoming branch associated with the TouchBHT instruction; and
  a target address field including a target address of the upcoming branch.

16. The system of claim 15, wherein the TouchBHT instruction further includes a tag information field including an indicator of whether the upcoming branch is a conditional branch.

17. The system of claim 15, wherein the TouchBHT instruction further includes a tag information field including an indicator of whether the upcoming branch is a taken branch.

18. The system of claim 13, wherein the identifier of the branch instruction is a function of the branch address.

19. The system of claim 13, wherein the identifier of the branch instruction is a function of the branch address and a global history vector.

20. The system of claim 13, wherein the processor is further operative to determine whether a branch mask field matches a global history vector, wherein the TouchBHT instruction includes the branch mask field having a branch action of the TouchBHT instruction and the prefetch history table includes a global history vector, and system execute the TouchBHT instruction responsive to determining that the branch mask field matches the global history vector.

21. A branch prediction system including:
  a means for receiving a branch instruction;
  a means for decoding a branch address and the branch instruction;
  a means for executing a branch action associated with the branch address and the branch instruction;
  a means for determining whether a branch associated with the executed branch action was taken;
  a means for saving an identifier of the branch instruction and an indicator that the branch action was taken in a prefetch history table responsive to determining that the branch associated with the branch action was taken;
  a means for receiving an prefetch branch history table (TouchBHT) instruction, wherein the TouchBHT instruction is associated with a second branch instruction;
  a means for retrieving an entry in the prefetch history table having an identifier associated with the second branch instruction responsive to receiving the TouchBHT instruction;
  a means for determining whether the entry indicates that a branch action associated with the second branch instruction was taken; and
  a means for executing the TouchBHT instruction responsive to determining that the entry indicates that the branch action associated with the second branch instruction was taken.

22. The system of claim 21, wherein the identifier of the branch instruction is a function of the branch address.

23. The system of claim 21, wherein the identifier of the branch instruction is a function of the branch address and a global history vector.

24. The system of claim 21, wherein the system further comprises:
  a means for determining whether a branch mask field matches a global history vector, wherein the TouchBHT instruction includes the branch mask field having a branch action of the TouchBHT instruction and the prefetch history table includes a global history vector; and
  a means for executing the TouchBHT instruction responsive to determining that the branch mask field matches the global history vector.

* * * * *